(12) United States Patent
Goggin et al.

(10) Patent No.: US 7,106,188 B2
(45) Date of Patent: Sep. 12, 2006

(54) METHOD AND SYSTEM FOR PROVIDING AN ACTIVATION SIGNAL BASED ON A RECEIVED RF SIGNAL

(76) Inventors: Christopher M. Goggin, 637 Wild Dunes Cir., Wilmington, NC (US) 26411; Patrick H. Stevens, 321 Brookfield Dr., Wilmington, NC (US) 28405

(*) Notice: Subject to any disclaimer, the term of this patent is extended or adjusted under 35 U.S.C. 154(b) by 438 days.

(21) Appl. No.: 10/662,041

(22) Filed: Sep. 11, 2003

(65) Prior Publication Data

US 2005/0012398 A1   Jan. 20, 2005

Related U.S. Application Data

(63) Continuation-in-part of application No. 10/317,919, filed on Dec. 11, 2002.

(51) Int. Cl.
G08B 1/08 (2006.01)
(52) U.S. Cl. ............... 340/539.1; 340/825.72; 455/229; 455/232.1; 455/334; 455/337; 329/347; 330/129; 327/52; 327/56; 327/72
(58) Field of Classification Search ............... None
See application file for complete search history.

(56) References Cited

U.S. PATENT DOCUMENTS

| | | | |
|---|---|---|---|
| 3,723,966 A | 3/1973 | Mueller et al. | |
| 4,376,931 A | 3/1983 | Komatu et al. | |
| 4,425,096 A | 1/1984 | Schwake | |
| 4,578,992 A | 4/1986 | Galasko et al. | |
| 4,588,978 A | 5/1986 | Allen | |
| 4,621,992 A * | 11/1986 | Angott | 417/572 |
| 4,686,380 A * | 8/1987 | Angott | 307/125 |
| 4,717,905 A | 1/1988 | Morrison, Jr. et al. | |
| 4,885,803 A * | 12/1989 | Hermann et al. | 398/112 |
| 5,309,147 A * | 5/1994 | Lee et al. | 340/567 |
| 5,435,271 A * | 7/1995 | Touchton et al. | 119/721 |
| 5,457,447 A | 10/1995 | Ghaem | |

(Continued)

FOREIGN PATENT DOCUMENTS

JP    405252081 A    9/1993

OTHER PUBLICATIONS

"Family of Nanopower Push-Pill Output Comparators", Texas Instruments, SLSC137B, pp. 1-15; Nov. 2000-Revised Aug. 2001.

(Continued)

*Primary Examiner*—Benjamin C. Lee
(74) *Attorney, Agent, or Firm*—Buchanan Ingersoll & Rooney PC

(57) ABSTRACT

A method and apparatus are described for providing an activation signal based on a received radio frequency (RTF) signal. The apparatus includes an RF receiver configured to admit a received RF signal in a given frequency band and a converter configured to convert the admitted RF signal to a proportional signal. The apparatus also includes a low power comparator that has a first and second input and an output. A biasing and offset compensation circuit is configured to bias the proportional signal higher by an offset midrange voltage and bias the second input to an offset compensated voltage based on an offset between the inputs of the comparator. The comparator is configured to receive the biased proportional signal at the first input and produce the activation signal at the output when a voltage difference between the biased proportional signal and the offset compensated voltage exceeds a comparison voltage threshold.

20 Claims, 4 Drawing Sheets

U.S. PATENT DOCUMENTS

| | | | |
|---|---|---|---|
| 5,479,160 A | 12/1995 | Koelle | |
| 5,621,412 A | 4/1997 | Sharpe et al. | |
| 5,636,048 A * | 6/1997 | Kogure et al. | 398/202 |
| 5,638,050 A | 6/1997 | Sacca et al. | |
| 5,686,891 A | 11/1997 | Sacca et al. | |
| 5,939,981 A | 8/1999 | Renney | |
| 6,025,783 A | 2/2000 | Steffens, Jr. | |
| 6,081,558 A * | 6/2000 | North | 375/316 |
| 6,147,602 A | 11/2000 | Bender | |
| 6,236,674 B1 | 5/2001 | Morelli et al. | |
| 6,294,953 B1 | 9/2001 | Steeves | |
| 6,366,202 B1 | 4/2002 | Rosenthal | |
| 6,461,301 B1 | 10/2002 | Smith | |
| 6,593,845 B1 | 7/2003 | Friedman et al. | |
| 6,614,296 B1 * | 9/2003 | Casper | 330/9 |
| 6,826,390 B1 * | 11/2004 | Tamura | 455/226.1 |
| 2002/0013527 A1 | 1/2002 | Hoek et al. | |
| 2002/0081991 A1 | 6/2002 | Eichin et al. | |
| 2002/0094850 A1 | 7/2002 | Brigaud et al. | |
| 2002/0172196 A1 * | 11/2002 | Komatsu et al. | 370/366 |
| 2002/0190689 A1 | 12/2002 | Nakamura et al. | |
| 2003/0011426 A1 * | 1/2003 | Casper | 330/9 |
| 2003/0104848 A1 | 6/2003 | Brideglall | |

OTHER PUBLICATIONS

"Single/Dual, +3V/+5V Dual-Speed Comparators with Auto-Standby—Max975/Max977", Maxim Integrated Products, pp. 1-16; 1998.

"Surface Mount to Zero Bias Schottky Detector Diodes", Agilent Technologies—HSMS-2850 Series, pp. 1-11; 1999.

"The Zero Bias Schottky Detector—Application Note 969", Hewlwtt Packard, pp. 1-6; 1994.

* cited by examiner

METHOD AND SYSTEM FOR PROVIDING AN ACTIVATION SIGNAL BASED ON A RECEIVED RF SIGNAL

RELATED APPLICATIONS

This application claims the benefit of priority from, and is a continuation in part of Copending U.S. patent application Ser. No. 10/317,919, filed under 37 C.F.R.153(b) on Dec. 11, 2002, entitled A Master Signal Transmitter with Allied Servant Receiver to Receive a Directed Signal from the Transmitter, all of which is hereby incorporated by reference.

BACKGROUND

This description relates to radio frequency (RF) activated devices. More particularly, the description relates to providing an activation signal based on a received RF signal.

A variety of RF receivers have been proposed to activate electronic devices. Conventional RF receivers typically require some kind of amplification to amplify the received signal for processing. Without amplification, the signal is too weak to process, or the distance from which signals can be received is severely limited. Amplification, however, results in a substantial and constant current drain on a battery power supply. Consequently, a problem with conventional RF receivers is that, due to the power demands, periodic battery replacement is required.

SUMMARY

It should be emphasized that the terms "comprises" and "comprising", when used in this description and claims, are taken to specify the presence of stated features, steps, or components, but the use of these terms does not preclude the presence or addition of one or more other features, steps, components, or groups thereof.

In one aspect, an apparatus is described for providing an activation signal based on a received RF signal. The apparatus includes an RF receiver configured to admit a received RF signal in a given frequency band and a converter configured to convert the admitted RF signal to a proportional signal. The apparatus also includes a low power comparator that has a first and second input and an output. A biasing and offset compensation circuit is configured to bias the proportional signal higher by an offset midrange voltage and bias the second input to an offset compensated voltage based on an offset between the inputs of the comparator. The comparator is configured to receive the biased proportional signal at the first input and produce the activation signal at the output when a voltage difference between the biased proportional signal and the offset compensated voltage exceeds a comparison voltage threshold.

In another aspect, a method for providing an activation signal based on a received RF signal includes admitting a received RF signal in a given frequency band and converting the admitted RF signal to a proportional signal. The proportional signal is biased higher by an offset midrange voltage, the biased proportional signal being provided to a first input of a low power comparator. A second input of the low power comparator is biased to an offset compensated voltage based on an offset between the first and second input of the low power comparator. The biased proportional signal is compared to the offset compensated voltage. An activation signal is produced at an output of the low power comparator when a voltage difference between the biased proportional signal and the offset compensated voltage exceeds a comparison voltage threshold.

In yet another aspect, an apparatus for providing an activation signal based on a received RF signal includes means for admitting a received RF signal in a given frequency band, means for converting the admitted RF signal to a proportional signal, and means for biasing the proportional signal higher by an offset midrange voltage, the biased proportional signal being provided to a first input of a low power comparator. The apparatus also includes means for biasing a second input of the low power comparator to an offset compensated voltage based on an offset between the first and second input of the low power comparator, means for comparing the biased proportional signal to the offset compensated voltage, and means for producing an activation signal at an output of the low power comparator when a voltage difference between the biased proportional signal and the offset compensated voltage exceeds a comparison voltage threshold.

BRIEF DESCRIPTION OF THE DRAWINGS

Objects and advantages of the claimed invention will become apparent to those skilled in the art upon reading this description in conjunction with the accompanying drawings.

DETAILED DESCRIPTION

Figure 1:
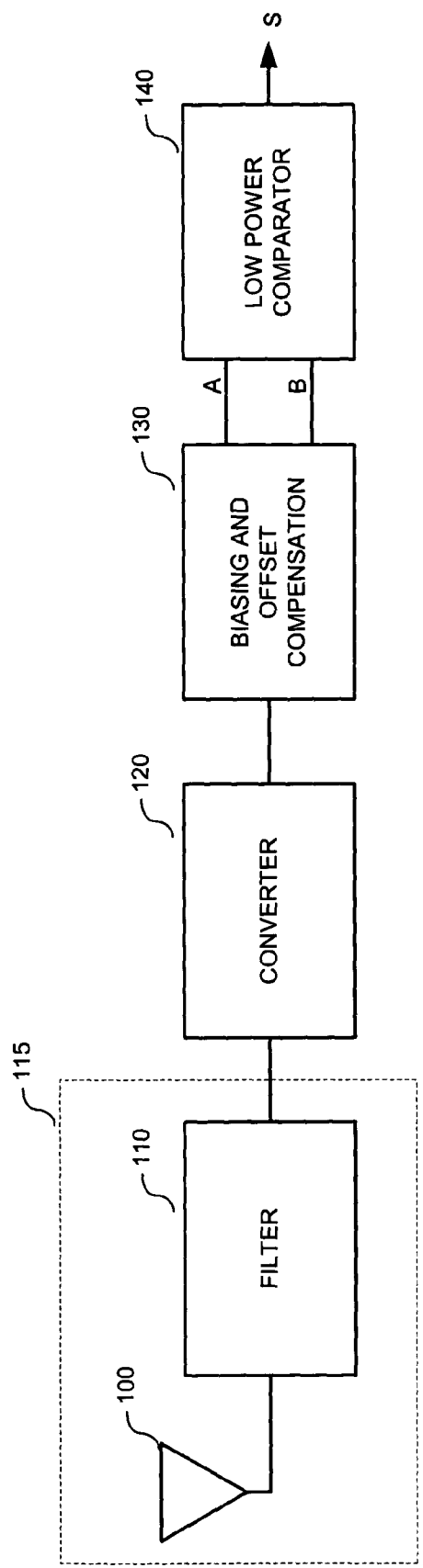
FIG. 1 is a block diagram illustrating an apparatus for providing an activation signal based on a received RF signal.

An apparatus for providing an activation signal based on a received RF signal is illustrated in the block diagram of FIG. 1. An RF receiver 115 is configured to admit a received RF signal in a given frequency band. The RF receiver 115 includes an antenna 100 and a filter 110. A converter 120 is configured to convert the admitted RF signal to a proportional signal. A low power comparator 140 has a first input A and a second input B.

A biasing and offset compensation circuit 130 is configured to bias the proportional signal higher by an offset midrange voltage and provide the biased proportional signal to the first input A of the comparator 140. The biasing and offset compensation circuit 130 is also configured to bias the second input B to an offset compensated voltage based on an offset between the first input A and second input B of the low power comparator 140.

The comparator is configured to produce an activation signal S at its output when a voltage difference between the biased proportional signal at the first input A and the offset compensated voltage at the second input B exceeds a comparison voltage threshold.

The apparatus of FIG. 1 provides an activation signal S that is based on a received low power RF signal without requiring any significant current to operate and will be active in the stand-by mode at all times. As will be explained later, the current draw of the apparatus is low enough so that a typical battery being continuously drained will exceed its useful shelf life before being fully drained.

Figure 2:
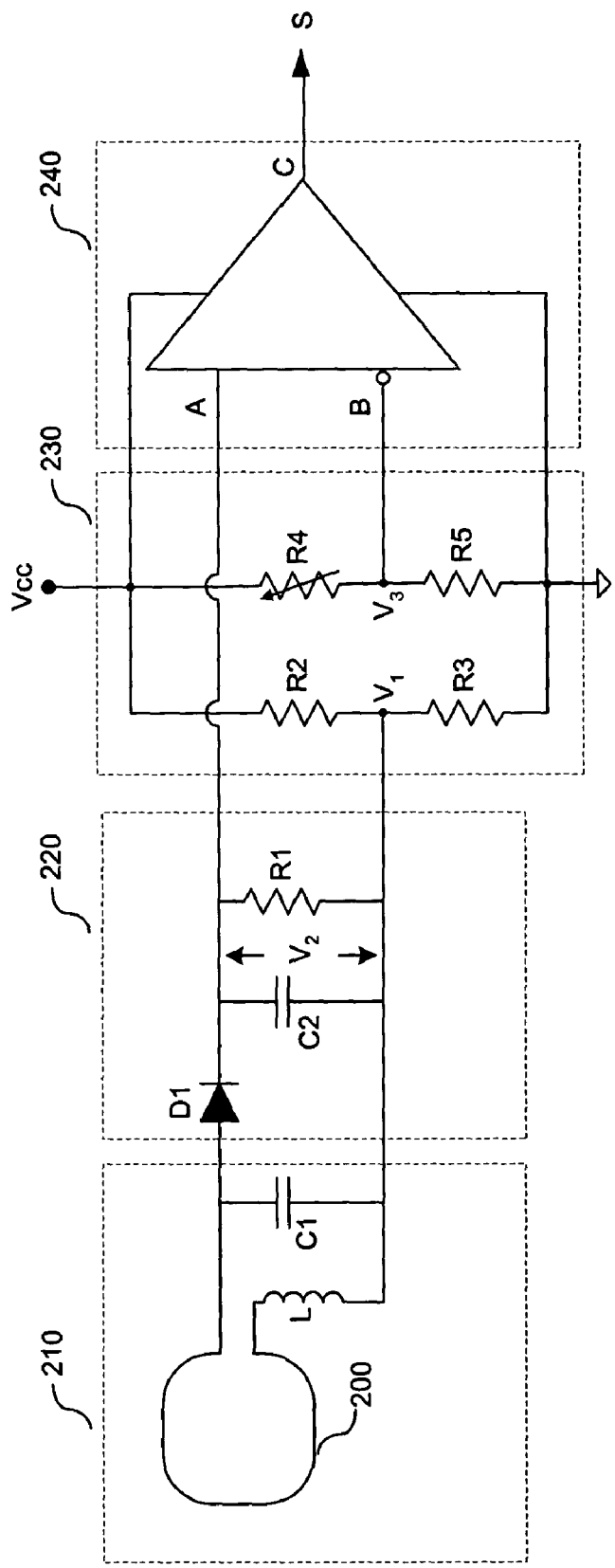
FIG. 2 is a block diagram illustrating an exemplary embodiment of the apparatus of FIG. 1.

FIG. 2 illustrates an exemplary embodiment of the apparatus. A means for admitting a received RF signal in a given frequency band includes an RF receiver 210. The RF receiver 210 includes an antenna 200 configured to receive the RF signal and a filter configured to filter the received RF signal to admit only RF signals in a given frequency band. The antenna 200 is preferably a loop antenna. It will be understood that many filter configurations that are known in the art may be used. In the exemplary embodiment shown, the filter comprises an inductive-capacitive (LC) resonant circuit formed by a capacitance C1 and an inductance L in parallel, such as the inductance of the antenna 200. It should be appreciated that the inductance L can be a separate inductor used in place of or in addition to the inductance of the antenna 200 to form the LC resonant circuit. Similarly, the capacitance C1 can be a discrete device capacitor or a capacitance property of an element or device. The capacitance C1 can be adjustable to allow tuning of the LC resonant circuit.

The values of the inductance L and capacitance C1 are chosen to resonate at a frequency F in a given frequency band using the expression:

$$F = \frac{1}{2\pi\sqrt{LC1}} \quad (1)$$

It should be understood that any frequency F could be used by selecting appropriate values for L and C1. An exemplary resonating frequency is approximately 916 MHz, where the received signal gain peaks at 916.5 MHz. The value of 916.5 MHz is relatively free from common usage in the U.S. and Europe. This will reduce, if not eliminate, false triggers by stray radio frequency signals in nearby radio frequency bands. At this frequency, the RF receiver can receive signals from a transmitter operating at 100 feet away, while the transmitter still remains compliant with FCC Rule 47 C.F.R. Part 15, Section 15.231. The antenna 200, when tuned to 916.5 MHz, is preferably shaped like a loop and has a diameter (D) of 0.82 inches. It is 0.125 (⅛) inches high (H) and is constructed of thin metallic foil 0.008 inches in width (W). The capacitance C1 is provided by a capacitor, which can have a capacitance value between 0.3 and 5 pf.

A means for converting the admitted RF signal includes a converter 220. The converter 220 includes a rectifier D1 configured to rectify the admitted signal and a capacitor C2 configured to accumulate and store the rectified signal. The rectifier is preferably a half-wave rectifier comprising a zero bias Schottsky diode. For example, an Agilent Technologies diode assigned part #HSMS-2850-BLK can be used.

The proportional signal is a voltage $V_2$ stored in the capacitor. The capacitor C2 accumulates and stores the rectified signal until the produced proportional signal exceeds the comparison voltage threshold of the comparator, as discussed further below. A resistor R1 together with the capacitor C2 form a parallel-RC circuit that converts the rectified signal to a proportional signal. That is, the capacitor C2 charges up to a voltage level $V_2$ proportional to the level of the admitted signal from the RF receiver 210. The capacitor C2 charges to the voltage level $V_2$ at a rate determined in part by the value of resistor R2 and capacitor C2. In an exemplary embodiment, the capacitor C2 value is 220 pf and the resistor R1 value is 1 MΩ).

A means for biasing the proportional signal, and a means for biasing an input of the comparator 240, includes a biasing and offset compensation circuit 230. The biasing and offset compensation circuit 230 includes a first voltage divider circuit that comprises resistors R2 and R3 and a second voltage divider circuit that comprises resistors R4 and R5. The first voltage divider circuit is configured to bias the proportional signal at $V_2$ higher by the midrange offset voltage $V_1$ so that the biased proportional signal is $V_1+V_2$.

The second voltage divider circuit is configured to provide a biasing voltage $V_3$ to compensate for the offset between the first input A and the second input B of the low power comparator 240. Low power comparators, also referred to as micro-comparators, offer the advantages of low current draw and high sensitivity, i.e., they can be triggered to provide an output C when a relatively small voltage difference is present between the first input A and the second input B. This voltage difference is referred to herein as the comparison voltage threshold. The use and performance of low power comparators, however, is encumbered by the inherent offset between their inputs A and B resulting from the less than ideal manufacturing process, such as tolerances, impurities, and the like. To take advantage of the high sensitivity, i.e., low comparison voltage threshold, the offset must be compensated for, since the offset voltage is typically significantly higher than the comparison voltage threshold.

A means for comparing the biased proportional signal to the offset compensated voltage and for producing an activation signal includes a low power comparator 240. For example, an exemplary low power comparator 240 that may be used in this application is the Texas Instruments Comparator #TI TLV3701. This model comparator has a comparison voltage threshold of approximately 250 μV and an offset voltage of between −5 mV and 5 mV. Therefore, in order to take advantage of the low comparison voltage threshold to trigger the low power comparator to provide an activation signal at the output C, the much higher offset voltage between inputs A and B must be compensated. For example, without compensation, if the offset voltage was such that [input A voltage]−[input B voltage]=−5 mV, the low power comparator 240 would not trigger until the proportional signal $V_2$ reaches 5 mV+250 μV=5.25 mV, which requires a much higher received signal voltage from the RF receiver 210 and converter 220. In other scenarios, the comparator could be triggered all the time, such as if the offset was such that: [input A voltage]−[input B voltage] >250 μV.

The biasing and offset compensation circuit 230 biases the proportional signal at $V_2$ and the second input B to take full advantage of the low comparison voltage threshold of the low power comparator 240. In the above example, the voltage offset [input A voltage]−[input B voltage] is between −5 mV and 5 mV. The first voltage divider circuit comprises resistors R2 and R3 and is configured to bias the proportional signal at $V_2$ higher by a midrange offset voltage $V_1$. For example, a midrange offset voltage $V_1$ of 5.1 mV biases the proportional signal at $V_2$ such that the signal $V_1+V_2$ at input A is always greater than zero. That is, the voltage offset [input A voltage]−[input B voltage] is shifted from between −5 mV and 5 mV to between 0.1 mV and 10.1 mV. The term midrange offset voltage is used here since the offset is shifted to begin approximately at the middle of its original range.

The second voltage divider circuit is configured to provide a biasing voltage $V_3$ to compensate for the offset as shifted by the first voltage divider circuit. For example, if the original unshifted offset, [input A voltage]−[input B voltage] =−3.5 mV, then the offset as shifted by a midrange offset voltage $V_1$ of 5.1 mV becomes −3.5 mV+5.1 mV=1.6 mV. Ideally the offset should be zero. By setting the biasing voltage $V_3$ to 1.6 mV through the selection of values for R4 and R5, the voltage difference between input A and input B is effectively zero. The second voltage divider circuit may include a voltage adjustment means, such as a variable resistor in place of resistor R4, although a fixed resistor value can be used.

The biasing and offset compensation circuit 230 adapts the low power comparator 240 to be triggered using a low comparison voltage threshold, e.g., 250 µV, so that a relatively low power signal admitted at the RF receiver 210 can trigger the low power comparator 240 without any amplification. Table 1 shows the exemplary test results of proportional signal voltages received from an FCC compliant transmitter at 916.5 MHz from various distances ranging from 1–107 feet away. As can be appreciated from Table 1, a transmitted FCC compliant signal received from a transmitter as far as 102.65 feet away at 916.5 MHz is more than adequate to trigger the low power comparator, i.e., is greater than 250 µV, without requiring any active amplifying circuit in the apparatus.

TABLE 1

| Distance From Transmitter (ft) | Proportional Signal Voltage (mV) |
|---|---|
| 1.00 | 46.00 |
| 15.70 | 6.10 |
| 20.04 | 0.95 |
| 24.39 | 0.47 |
| 28.70 | 0.85 |
| 33.10 | 0.33 |
| 37.43 | 0.18 |
| 41.70 | 1.50 |
| 46.13 | 1.20 |
| 50.47 | 1.20 |
| 54.83 | 1.20 |
| 59.17 | 2.30 |
| 63.50 | 0.12 |
| 67.86 | 3.40 |
| 72.20 | 1.90 |
| 76.56 | 0.80 |
| 80.91 | 3.00 |
| 85.20 | 1.40 |
| 89.60 | 0.90 |
| 93.90 | 0.25 |
| 98.30 | 1.40 |
| 102.65 | 9.20 |
| 107.00 | 0.10 |

In operation, a signal is received at the RF receiver 210 via antenna 200. The signal is admitted if the frequency is close to the resonant frequency of the LC resonant circuit of L and C1 in parallel. The signal is rectified by the diode D1. The rectified signal charges capacitor C2 until a proportional signal voltage $V_2$ reaches the comparison voltage threshold of the comparator. Meanwhile, the biasing and offset compensation circuit 230 adapts the low power comparator 240 as described above to be triggered by the comparison voltage threshold. The comparator 240 is then triggered as a result, thus producing the activations signal S at output C.

The apparatus of FIG. 2 uses a negligible amount of current. For example, the exemplary low power comparator requires less than 1 µA of current, and more particularly can operate with only approximately 0.56 µA. Given a supply voltage Vcc of 3 VDC, the first and second voltage divider circuits require about 1.7 µA or less of total current. The combined total can be approximated to be 2.6 µA. The rest of the power is derived from the received signal. Assuming the supply voltage $V_{cc}$ is taken from a 3 V battery, under current technology that use chemical reaction for 3 V batteries, the shelf life of the battery, even if no drain is present, is limited by the viability of the chemical reactions that produce current. Typically, the shelf life of most 3 V batteries is no more than 10 years. These batteries will, if drained at a rate of approximately 2.6 µA, still have sufficient charge to operate at the end of the normal shelf life for a 3 V battery. That is, the battery will stop working because the chemical reactions that provide the power have stopped working, not because the battery has been drained by the approximately 2.6 µA of current required by the apparatus. Consequently, for the purposes of this application, if the current drain caused by the voltage comparator is so small that it will not substantially reduce the ordinary shelf life of the battery, it will be deemed negligible.

This negligible power requirement offers many advantages. The apparatus of FIG. 2 can be incorporated into a variety of other short range RF products to act as an RF switch to activate or "wake up" the various components and/or functions of the product. Since the product can essentially "sleep" until woken up by the apparatus, the overall battery drain of the product can be negligible. Accordingly, the batteries can go without being replaced for the life of the product. The product can be produced as a sealed disposable product, which significantly reduces production costs.

Figure 3:
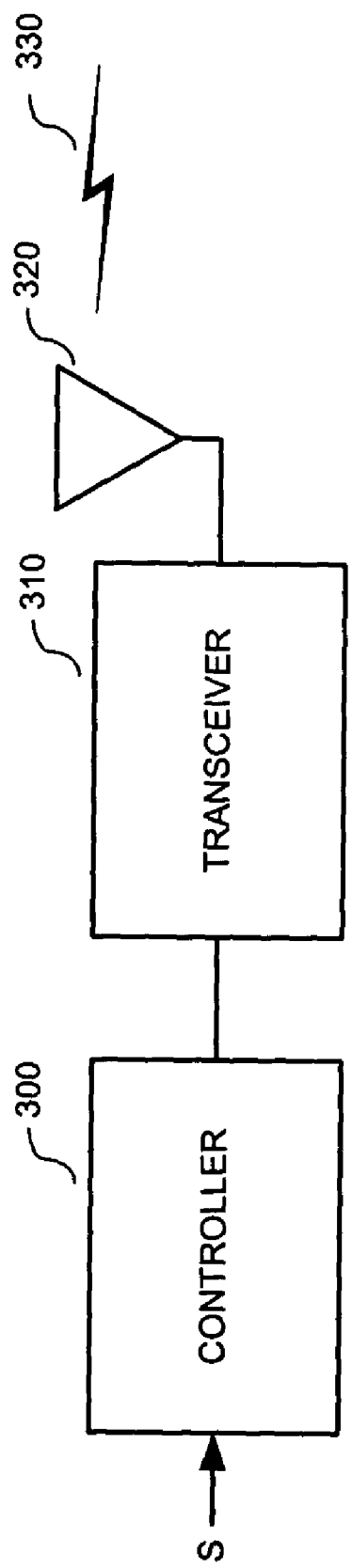
FIG. 3 is a block diagram illustrating an application of the apparatus of FIG. 1 or 2.

FIG. 3 illustrates one application of the apparatus. The activation signal S produced by the low power comparator 240 is provided to a controller 300. The controller is, until this point, in a low power sleep mode. The controller 300 wakes up upon receiving the activation signal S and sends a signal to a transceiver 310 to wake up from a sleep mode. The transceiver 310 begins receiving and/or transmitting communication data 330 via an antenna 320, which may or may not be the same antenna as antenna 200. The communication data 330 received by the transceiver 310 is processed by the controller 300, which may perform a variety of functions involving a variety of input-output devices (not shown) as a result.

Figure 4:
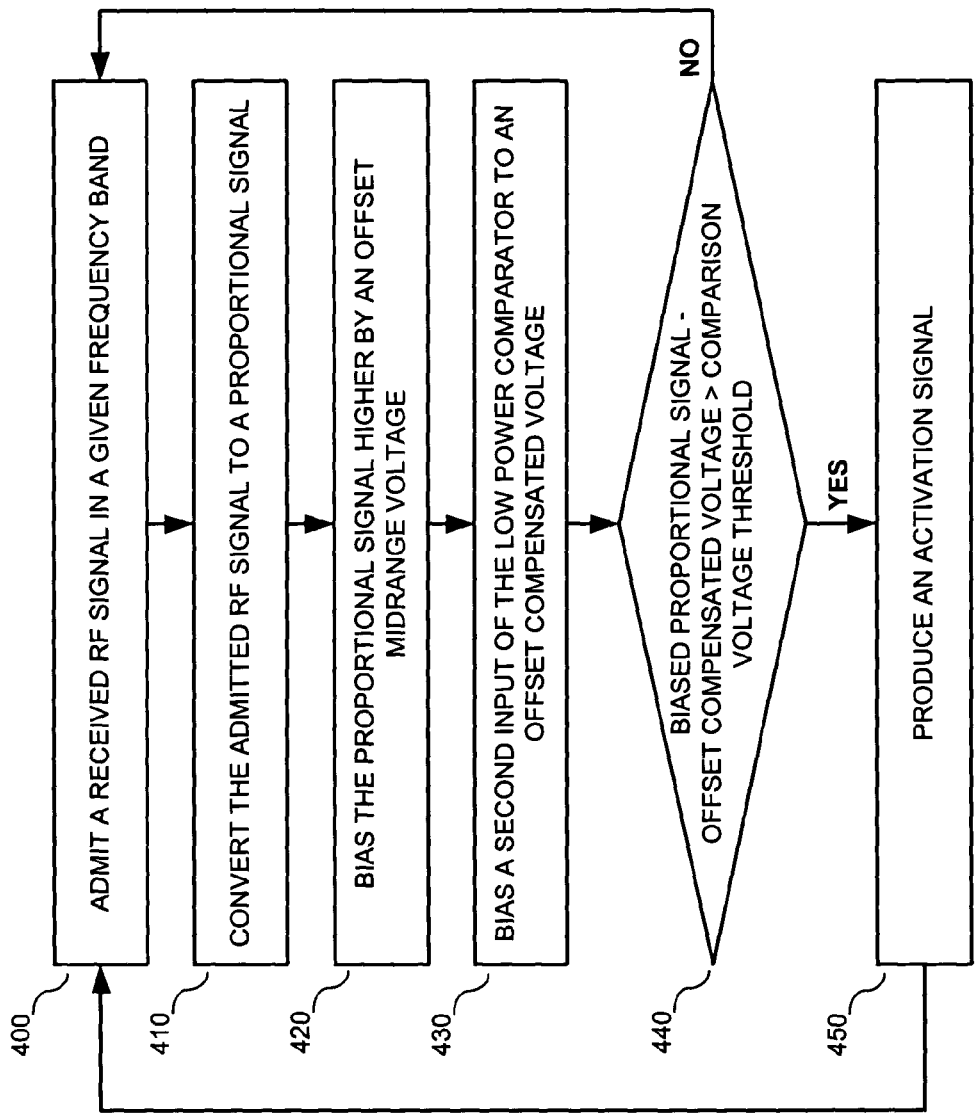
FIG. 4 is a flowchart illustrating a method for providing an activation signal based on a received RF signal.

A method for providing an activation signal based on a received RF signal is illustrated in FIG. 4. In block 400, a received RF signal in a given frequency band is admitted. In block 410, the admitted RF signal is converted to a proportional signal. In block 420, the proportional signal is biased higher by an offset midrange voltage. In block 430, a second input of the low power comparator is biased to an offset compensated voltage based on an offset between the first and second input of the low power comparator. In block 440, the biased proportional signal is compared to the offset compensated voltage. In block 450, an activation signal is produced at an output of the low power comparator when a voltage difference between the biased proportional signal and the offset compensated voltage exceeds a comparison voltage threshold.

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

What is claimed is:

1. An apparatus for providing an activation signal based on a received radio frequency (RF) signal, the apparatus comprising:

an RF receiver configured to admit a received RF signal in a given frequency band;

a converter configured to convert the admitted RF signal to a proportional signal;

a low power comparator that has a first and second input and an output; and a biasing and offset compensation circuit configured to bias the proportional signal higher by an offset midrange voltage and bias the second input to an offset compensated voltage based on an offset between the first and second input of the low power comparator, wherein the comparator is configured to receive the biased proportional signal at the first input and produce the activation signal at the output when a voltage difference between the biased proportional signal and the offset compensated voltage at the second input exceeds a comparison voltage threshold.

2. The apparatus of claim 1, wherein the biasing and offset compensation circuit comprises:

a first voltage divider circuit configured to bias the proportional signal higher by the midrange offset voltage; and a second voltage divider circuit configured to compensate for the offset between the first and second input of the low power comparator.

3. The apparatus of claim 2, wherein the second voltage divider circuit includes a voltage adjustment means.

4. The apparatus of claim 3, wherein the voltage adjustment means is a variable resistor.

5. The apparatus of claim 1, wherein the RF receiver comprises:

an antenna configured to receive the RF signal; and a filter configured to filter the received RF signal to admit only RF signals in a given frequency band.

6. The apparatus of claim 5, wherein the antenna is a loop antenna.

7. The apparatus of claim 5, wherein the filter comprises an inductive-capacitive (LC) resonant circuit.

8. The apparatus of claim 7, wherein the LC resonant circuit includes the inductance of the antenna.

9. The apparatus of claim 7, wherein the LC resonant circuit resonates at a frequency of approximately 916.5 MHz.

10. The apparatus of claim 1, wherein the converter comprises:

a rectifier configured to rectify the admitted signal; and a capacitor configured to accumulate and store the rectified signal, wherein the proportional signal is a voltage stored in the capacitor.

11. The apparatus of claim 10, wherein the capacitor is configured to accumulate and store the rectified signal until the produced proportional signal exceeds the comparison voltage threshold.

12. The apparatus of claim 10, wherein the rectifier is a half-wave rectifier comprising a zero bias Schottsky diode.

13. The apparatus of claim 1, wherein the comparison voltage threshold is approximately 250 µV.

14. The apparatus of claim 1, wherein the midrange offset voltage is approximately 5.1 mV.

15. The apparatus of claim 1, wherein the offset between the first and second input of the low power comparator is between −5 mV and 5 mV.

16. The apparatus of claim 1, wherein the low power comparator requires less than 1 µA of supply current during operation.

17. The apparatus of claim 1, wherein the activation signal instructs a microprocessor to change modes of operation.

18. A method for providing an activation signal based on a received RF signal, the method comprising:

admitting a received RF signal in a given frequency band;

converting the admitted RF signal to a proportional signal;

biasing the proportional signal higher by an offset midrange voltage, the biased proportional signal being provided to a first input of a low power comparator;

biasing a second input of the low power comparator to an offset compensated voltage based on an offset between the first and second input of the low power comparator, comparing the biased proportional signal to the offset compensated voltage; and producing an activation signal at an output of the low power comparator when a voltage difference between the biased proportional signal and the offset compensated voltage exceeds a comparison voltage threshold.

19. An apparatus for providing an activation signal based on a received RF signal, the apparatus comprising:

means for admitting a received RF signal in a given frequency band;

means for converting the admitted RF signal to a proportional signal;

means for biasing the proportional signal higher by an offset midrange voltage, the biased proportional signal being provided to a first input of a low power comparator;

means for biasing a second input of the low power comparator to an offset compensated voltage based on an offset between the first and second input of the low power comparator, means for comparing the biased proportional signal to the offset compensated voltage; and means for producing an activation signal at an output of the low power comparator when a voltage difference between the biased proportional signal and the offset compensated voltage exceeds a comparison voltage threshold.

20. An apparatus for providing an activation signal based on a received RF signal, the apparatus comprising:

an RF receiver configured to admit a received RF signal in a given frequency band;

a converter configured to convert the admitted RF signal to a proportional signal;

a low power comparator that has a first and second input and an output; and a biasing and offset compensation circuit configured to bias the proportional signal higher by approximately 5.1 mV and bias the second input to an offset compensated voltage based on an offset between the first and second input of the low power comparator, wherein the comparator is configured to receive the biased proportional signal at the first input and produce the activation signal at the output when a voltage difference between the biased proportional signal and the offset compensated voltage at the second input exceeds 250 µV.

* * * * *